(12) United States Patent
Chevrier et al.

(10) Patent No.: US 9,787,831 B1
(45) Date of Patent: *Oct. 10, 2017

(54) COMMUNICATION DEVICE AND RELATED METHODS FOR AUTOMATICALLY CONNECTING TO A CAPTIONING COMMUNICATION SERVICE TO RECEIVE TEXT CAPTIONS FOLLOWING AN INTERRUPTION DURING A CALL

(71) Applicant: Sorenson IP Holdings, LLC, Salt Lake City, UT (US)

(72) Inventors: Brian Chevrier, Highland, UT (US); Michael S. Stimpson, Taylorsville, UT (US)

(73) Assignee: Sorenson IP Holdings, LLC, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/942,905

(22) Filed: Nov. 16, 2015

Related U.S. Application Data (63) Continuation of application No. 14/668,868, filed on Mar. 2, 2015, now Pat. No. 9,197,745.

(51) Int. Cl.
| | |
|---|---|
| *H04M 11/00* | (2006.01) |
| *H04M 3/42* | (2006.01) |
| *H04M 1/247* | (2006.01) |

(52) U.S. Cl.
CPC ..... *H04M 3/42391* (2013.01); *H04M 1/2475* (2013.01)

(58) Field of Classification Search
None
See application file for complete search history.

(56) References Cited

U.S. PATENT DOCUMENTS

| | | |
|---|---|---|
| 2,806,902 A | 9/1957 | Gutierrez |
| 3,553,385 A | 1/1971 | Morgan et al. |

(Continued)

OTHER PUBLICATIONS

Ultratec, Inc. "Petition" 91 pages, In the United States Patent and Trademark Office Before the Patent Trial and Appeal Board, *Ultratec, Inc.* v. *CaptionCall, L.L.C.*, Case No. TBD, U.S. Pat. No. 9,197,745.

(Continued)

*Primary Examiner* — Maria El-Zoobi
(74) *Attorney, Agent, or Firm* — Maschoff Brennan (57) ABSTRACT

Apparatuses and methods are disclosed for automatically connecting to a relay service and establish a captioning communication session during a call between a hearing-impaired user and a far-end user. The apparatus includes communication elements configured to receive captions from a relay service, and a processor configured to automatically connect to the relay service and establish a captioning communication session during a call responsive to a determination that a connection to the relay service failed during a time in which the hearing-impaired user desired captions to be enabled. A method includes determining captions are desired by the hearing-impaired user at a first time to be enabled for display to the communication device during a call, detecting a failed connection to the relay service at a second time, and automatically connecting with the relay service and establishing a new captioning communication session at a third time during the call.

28 Claims, 4 Drawing Sheets

(56) References Cited

U.S. PATENT DOCUMENTS

| | | | |
|---|---|---|---|
| 3,792,203 | A | 2/1974 | Martin |
| 5,909,482 | A | 6/1999 | Engelke |
| 5,974,116 | A | 10/1999 | Engelke et al. |
| 5,978,654 | A | 11/1999 | Colwell et al. |
| 6,075,841 | A | 6/2000 | Engelke et al. |
| 6,075,842 | A | 6/2000 | Engelke et al. |
| 6,233,314 | B1 | 5/2001 | Engelke |
| 6,307,921 | B1 | 10/2001 | Engelke et al. |
| 6,343,216 | B1 | 1/2002 | Kim et al. |
| 6,360,109 | B1 * | 3/2002 | Thauvin .......... H04M 1/274575 455/423 |
| 6,445,921 | B1 | 9/2002 | Bell |
| 6,493,426 | B2 | 12/2002 | Engelke et al. |
| 6,504,910 | B1 | 1/2003 | Engelke et al. |
| 6,510,206 | B2 | 1/2003 | Engelke et al. |
| 6,549,611 | B2 | 4/2003 | Engelke et al. |
| 6,567,503 | B2 | 5/2003 | Engelke et al. |
| 6,594,346 | B2 | 7/2003 | Engelke |
| 6,603,835 | B2 * | 8/2003 | Engelke .................. G10L 15/26 379/100.09 |
| 6,636,741 | B2 | 10/2003 | Yoshioka et al. |
| 6,748,053 | B2 | 6/2004 | Engelke et al. |
| 6,810,260 | B1 | 10/2004 | Morales |
| 6,882,707 | B2 | 4/2005 | Engelke et al. |
| 6,885,731 | B2 | 4/2005 | Engelke et al. |
| 6,934,366 | B2 | 8/2005 | Engelke et al. |
| 7,003,082 | B2 | 2/2006 | Engelke et al. |
| 7,006,604 | B2 | 2/2006 | Engelke |
| 7,102,663 | B2 | 9/2006 | Crook |
| 7,164,753 | B2 | 1/2007 | Engelke et al. |
| 7,319,740 | B2 | 1/2008 | Engelke et al. |
| 7,555,104 | B2 | 6/2009 | Engelke |
| 7,660,398 | B2 | 2/2010 | Engelke et al. |
| 7,881,441 | B2 | 2/2011 | Engelke et al. |
| 7,974,610 | B2 | 7/2011 | Nachum |
| 8,213,578 | B2 | 7/2012 | Engleke et al. |
| 8,379,801 | B2 | 2/2013 | Romriell et al. |
| 8,416,925 | B2 | 4/2013 | Engelke et al. |
| 8,804,944 | B1 | 8/2014 | Hopkins |
| 8,861,703 | B2 | 10/2014 | Labrador et al. |
| 8,908,838 | B2 | 12/2014 | Engelke et al. |
| 8,917,821 | B2 | 12/2014 | Engelke et al. |
| 8,917,822 | B2 | 12/2014 | Engelke et al. |
| 9,197,745 | B1 | 11/2015 | Chevrier et al. |
| 2006/0238608 | A1 | 10/2006 | Lee et al. |
| 2007/0220582 | A1 | 9/2007 | Hallberg et al. |
| 2007/0274488 | A1 | 11/2007 | Callaghan |
| 2007/0275711 | A1 | 11/2007 | Buti et al. |
| 2008/0187108 | A1 | 8/2008 | Engelke et al. |
| 2008/0232575 | A1 | 9/2008 | Gumbula |
| 2009/0063697 | A1 | 3/2009 | Fukao |
| 2009/0203375 | A1 * | 8/2009 | Gisby .................. H04W 8/30 455/426.1 |
| 2011/0170672 | A1 | 7/2011 | Engelke et al. |
| 2011/0230184 | A1 * | 9/2011 | Tal ................... H04M 3/42374 455/425 |
| 2011/0249079 | A1 | 10/2011 | Santamaria et al. |
| 2012/0250837 | A1 | 10/2012 | Engleke et al. |
| 2014/0056305 | A1 | 2/2014 | Tanimoto |
| 2014/0106699 | A1 | 4/2014 | Chitre et al. |
| 2014/0149489 | A1 | 5/2014 | Kathuria |
| 2015/0011251 | A1 | 1/2015 | Parker |
| 2016/0105554 | A1 * | 4/2016 | Engelke ............... H04M 11/066 379/52 |

OTHER PUBLICATIONS

Ultratec, Inc. Ex. 1002 "Declaration of Ivan Zatkovick in Support of Petition for Post-Grant Review of U.S. Pat. No. 9,197,745" 111 pages, In the United States Patent and Trademark Office Before the Patent Trial and Appeal Board, *Ultratec, Inc.* v. *CaptionCall, L.L.C.*, Case No. TBD, U.S. Pat. No. 9,197,745, Submitted Electronically via PRPS.

Ultratec, Inc. Ex. 1003 "Ivan Zatkovich Curriculum Vitae" 15 pages, In the United States Patent and Trademark Office Before the Patent Trial and Appeal Board, *Ultratec, Inc.* v. *CaptionCall, L.L.C.*, Case No. TBD, U.S. Pat. No. 9,197,745.

Ultratec, Inc. Ex. 1005 "Affidavit of Christopher Butler" 105 pages, In the United States Patent and Trademark Office Before the Patent Trial and Appeal Board, *Ultratec, Inc.* v. *CaptionCall, L.L.C.*, Case No. TBD, U.S. Pat. No. 9,197,745.

Ultratec, Inc. Ex. 1010 "vol. 78, No. 169/Friday, Aug. 30, 2013/ Rules and Regulations" 11 pages, In the United States Patent and Trademark Office Before the Patent Trial and Appeal Board, *Ultratec, Inc.* v. *CaptionCall, L.L.C.*, Case No. TBD, U.S. Pat. No. 9,197,745.

Ultratec, Inc. Ex. 1011 "Federal Register/vol. 71, No. 105/Thursday, Jun. 1, 2006/Proposed Rules" 7 pages, In the United States Patent and Trademark Office Before the Patent Trial and Appeal Board, *Ultratec, Inc.* v. *CaptionCall, L.L.C.*, Case No. TBD, U.S. Pat. No. 9,197,745.

Ultratec, Inc. Ex. 1012 "Declaration of Kevin Colwell" 5 pages, In the United States Patent and Trademark Office Before the Patent Trial and Appeal Board, *Ultratec, Inc.* v. *CaptionCall, L.L.C.*, Case No. TBD, U.S. Pat. No. 9,197,745.

Ultratec, Inc. Ex. 1013 "Internet Communication Using SIP-Delivering VoIP and Multimedia Services with Session Initiation Protocol" Wiley Second Edition, 409 pages, In the United States Patent and Trademark Office Before the Patent Trial and Appeal Board, *Ultratec, Inc.* v. *CaptionCall, L.L.C.*, Case No. TBD, U.S. Pat. No. 9,197,745.

Ultratec, Inc. Ex. 1019 "Affidavit of Christopher Butler" 122 pages, In the United States Patent and Trademark Office Before the Patent Trial and Appeal Board, *Ultratec, Inc.* v. *CaptionCall, L.L.C.*, Case No. TBD, U.S. Pat. No. 9,197,745.

"Post Grant Review Decision", received in Case PGR2016-00037, U.S. Pat. No. 9,197,745 B1, entered on Feb. 22, 2017, 33 pages.

\* cited by examiner

COMMUNICATION DEVICE AND RELATED METHODS FOR AUTOMATICALLY CONNECTING TO A CAPTIONING COMMUNICATION SERVICE TO RECEIVE TEXT CAPTIONS FOLLOWING AN INTERRUPTION DURING A CALL

CROSS-REFERENCE TO RELATED APPLICATION

This application is a continuation of U.S. patent application Ser. No. 14/668,868, filed Mar. 25, 2015, U.S. Pat. No. 9,197,745 (Nov. 24, 2015), the disclosure of which is hereby incorporated herein in its entirety by this reference.

TECHNICAL FIELD

The application relates generally to telecommunications and more particularly to communicating with a relay service for assisting hearing-impaired users in communicating with others. In addition, the disclosure relates to automatically reconnecting to establish a captioning communication session with the relay service following an unwanted interruption to the captioning communication session.

BACKGROUND

Hearing-impaired individuals may benefit from communication systems and devices configured to provide assistance in order to communicate with other individuals over a communication network. For example, relay services have been established to provide assistive services (e.g., text captions) to the hearing-impaired user communicating with a communication device (e.g., caption phone, caption enabled device, etc.) that is specifically configured to communicate with the relay service.

In particular, a relay service may be a telecommunication intermediary service, which is intended to permit a deaf or a hearing-impaired person to utilize a normal telephone network. The relay service may include an operator, referred to as a "call assistant," who serves as a human intermediary between the hearing-impaired user and a far-end user. During a captioning communication session, the call assistant may listen to the audio signal of a far-end user and "revoice" the words of the far-end user to a speech recognition computer program tuned to the voice of the call assistant. Text captions (also referred to as "captions") may be generated by the speech recognition computer as a transcription of the audio signal of the far-end user, and then transmitted to the communication device being used by the hearing-impaired user. The communication device may then display the text captions while the hearing-impaired user carries on a normal conversation with the far-end user. The text captions may allow the hearing-impaired user to supplement the voice received from the far-end and confirm his or her understanding of the words spoken by the far-end user.

In some situations, the text captions may be transmitted to the user's communication device over a separate network than the voice signal from the far end. During a captioning communication session, there may be a problem with the network that may cause the captioning communication session between the hearing-impaired user's communication device and the relay service to terminate. As a result, the hearing-impaired user's communication device may no longer receive and display the text captions. The termination of the connection may not have been initiated or desired by the user, and the user may lose the benefit of the text captions. Conventionally, the user may need to press a caption button to start another captioning communication session with the relay service to again start to receive the text captions.

BRIEF SUMMARY

Embodiments of the disclosure include an apparatus associated with a hearing-impaired user. The apparatus comprises communication elements and a processor operably coupled with the communication elements. The communication elements are configured to receive audio signals from a far end communication device, and receive captions corresponding to the audio signals from a relay service. The processor is configured to automatically connect to the relay service and establish a captioning communication session during a call responsive to a determination that a connection to the relay service failed during a time in which the hearing-impaired user desired captions to be enabled.

Also disclosed is a method of establishing a captioning communication session with a relay service for assisting a hearing-impaired user of a communication device. The method comprises determining that captions are desired by the hearing-impaired user at a first time to be enabled for display to the communication device during a call, detecting a failed connection to the relay service at a second time, and automatically connecting with the relay service and establishing a new captioning communication session between the relay service and the communication device at a third time during the call.

Also disclosed is an apparatus associated with a hearing-impaired user. The apparatus comprises an electronic display, communication elements, and a processor operably coupled with the electronic display and the communication elements. The communication elements are configured to receive audio signals from a far end communication device, and receive captions corresponding to the audio signals from a relay service. The processor is configured to establish a captioning communication session with the relay service during a call with the far end communication device, transmit the audio signals from the far end communication device to the relay service, receive text captions from the relay service corresponding to the audio signals from the far end communication device, display the text captions on the electronic display, terminate the captioning communication session responsive to a user input through a user interface of the apparatus, and automatically connect to the relay service and establish a new captioning communication session during the call responsive to a determination that the captioning communication session is terminated in a manner that is different than a user input through the user interface.

DETAILED DESCRIPTION

In the following detailed description, reference is made to the accompanying drawings which form a part hereof, and in which is illustrated specific embodiments in which the disclosure may be practiced. These embodiments are described in sufficient detail to enable those of ordinary skill in the art to practice the disclosure. It should be understood, however, that the detailed description and the specific examples, while indicating examples of embodiments of the disclosure, are given by way of illustration only and not by way of limitation. From this disclosure, various substitutions, modifications, additions, rearrangements, or combinations thereof within the scope of the disclosure may be made and will become apparent to those of ordinary skill in the art.

In accordance with common practice, the various features illustrated in the drawings may not be drawn to scale. The illustrations presented herein are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method. In addition, like reference numerals may be used to denote like features throughout the specification and figures.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the disclosure may be implemented on any number of data signals including a single data signal.

The various illustrative logical blocks, modules, circuits, and algorithm acts described in connection with embodiments disclosed herein may be implemented or performed with a general-purpose processor, a special-purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein.

A processor herein may be any processor, controller, microcontroller, or state machine suitable for carrying out processes of the disclosure. A processor may also be implemented as a combination of computing devices, such as a combination of a DSP and a microprocessor, a plurality of microprocessors, one or more microprocessors in conjunction with a DSP core, or any other such configuration. When configured according to embodiments of the disclosure, a special-purpose computer improves the function of a computer because, absent the disclosure, the computer would not be able to carry out the processes of the disclosure. The disclosure also provides meaningful limitations in one or more particular technical environments that go beyond an abstract idea. For example, embodiments of the disclosure provide improvements in the technical field of telecommunications, particularly in a telecommunication system including a relay service for providing text captions to a caption-enabled communication device to assist hearing-impaired users. Embodiments include features that improve the functionality of the communication device such that new communication device and method for establishing captioning communication sessions are described. As a result, the interaction of the communication device with other systems (e.g., the relay service) may be improved in addition to an improved user experience.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, interfacing with an operating system, etc. Furthermore, the methods disclosed herein may be implemented in hardware, software, or both. If implemented in software, the functions may be stored or transmitted as one or more instructions (e.g., software code) on a computer-readable medium. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

As used herein, a "hearing-impaired user" may refer to a person with diminished hearing capabilities. Hearing-impaired users of caption-enabled communication device often have some level of hearing ability that has usually diminished over a period of time such that they can communicate by speaking, but that they often struggle in hearing and/or understanding the far-end user.

The term "call," as used herein, refers to the communication session between the hearing-impaired user's communication device and the far-end user's communication device. The call may pass audio signals between the two parties. The term call is used in order to be more easily distinguishable from the captioning communication session. At times, the call may be referred to as incoming or outgoing from the perspective of the hearing-impaired user's communication device. Incoming and outgoing calls may refer to the period of time prior to when the call is "answered" by the other party to begin the communication of the audio signals therebetween.

The term "captioning communication session," as used herein, refers to the communication session between the hearing-impaired user's communication device and the relay service. The captioning communication session may pass text captions from the relay service to the hearing-impaired user's communication device. In some embodiments, the captioning communication session may also include the hearing-impaired user's communication device transmitting the far-end user's audio signal to the relay service to generate the text captions.

Figure 1:
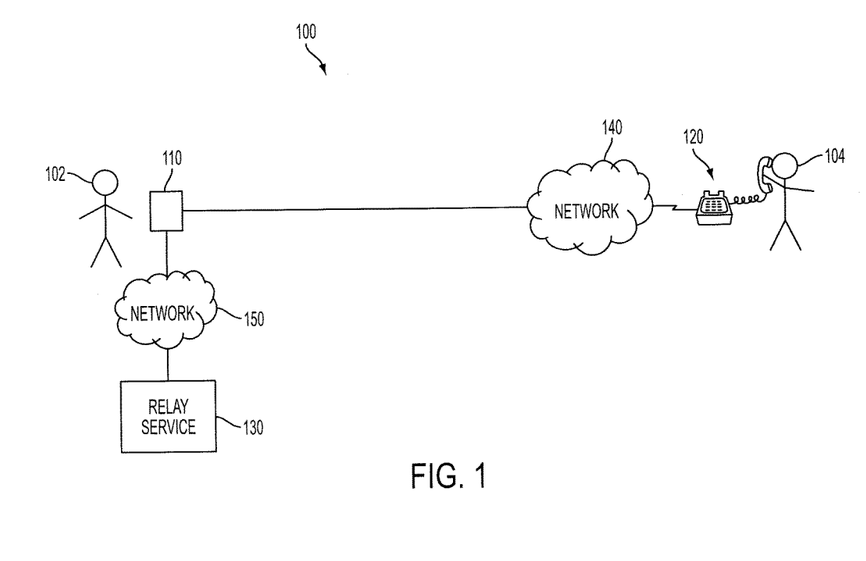
FIG. 1 illustrates a communication system configured to facilitate a call between a hearing-impaired user and a far-end user.

FIG. 1 illustrates a communication system 100 configured to facilitate an assisted call between a hearing-impaired user 102 and a far-end user 104. The communication system 100 may include a first communication device 110, a second communication device 120, and a relay service 130. The first communication device 110 and the second communication device 120 may be coupled together to facilitate communication therebetween via a first network 140. The first communication device 110 and the relay service 130 may be coupled together to facilitate communication therebetween via a second network 150. For example only, the first network 140 and the second network 150 may each be implemented according to the standards and bandwidth requirements of a communication network (e.g., Public Switch Telephone Network (PSTN), cellular network, Voice Over Internet Protocol (VOIP) networks, etc.). The use of the terms "network" or "communication network," as used herein, contemplates networks that are compatible and configured to provide communications using analog and/or digital standards unless specifically stated otherwise. In some embodiments, the first network 140 and the second network 150 may be the same network (e.g., both connections may be Internet-based connections). Thus, discussion of the first network 140 and the second network 150 separately may be for convenience of discussing a particular connection between two or more devices. Of course, in some embodiments, the first network 140 and the second network 150 may be different networks. For example, the first communication device 110 and the second communication device 120 may communicate via a PSTN network connection, while the first communication device 110 and the second communication device 120 may communicate via an internet connection. Other variations and combinations of networks are also contemplated.

The first communication device 110 may include a device that is configured to assist the hearing-impaired user 102 in communicating with another individual (e.g., far-end user 104). In some embodiments, the first communication device 110 may include a caption-enabled communication device configured to receive and display text captions of at least a portion of the conversation. Thus, the hearing-impaired user 102 may be able to read the text captions of the words spoken by the far-end user 104 to supplement the audio signal received by the first communication device 110. As a result, the hearing-impaired user 102 may have an improved experience in understanding the conversation. Such an embodiment may be useful for people whose hearing has been damaged or decreased over time (e.g., the elderly); such that they can still speak but have diminished hearing that makes it difficult to communicate. In some embodiments, the first communication device 110 may also be configured to receive and display video on an electronic display on the first communication device 110.

The second communication device 120 may comprise a conventional voice telephone (e.g., landline phone, cellular phone, smart phone, VoIP phone, etc.). As such, the far-end user 104 may interact in a conventional manner with the second communication device 120. In some embodiments, the second communication device 120 may be configured similarly as the first communication device (e.g., caption-enabled communication device). As a result, the second communication device 120 may likewise be operated by a hearing-impaired user. Thus, although facilitating communication between the hearing-impaired user 102 and the far-end user 104 is shown in FIG. 1 to imply that the far-end user 104 is a hearing-capable user, such a situation is shown only as an example. Other embodiments include both the first communication device 110 and the second communication device 120 coupled to the relay service 130 to facilitate the captioning services for each respective hearing-impaired user. In such a situation, each communication device 110, 120 may have its own communication session with the relay service 130.

The relay service 130 may be configured to provide interpretive services (e.g., captioning) to the hearing-impaired user 102. More specifically, a human "call assistant" within relay service 130 may be employed to facilitate an assisted call between a hearing-impaired user 102 and a far-end user 104. As discussed above, in some embodiments the relay service 130 may be configured to provide text captions of at least a portion of the conversation. In such an embodiment, the call assistant may listen to the voice signal received and re-voice the portion of the conversation into a microphone so that voice recognition software may generate the text captions that are transmitted to the first communication device 110. Thus, the relay service 130 may include one or more of an internet protocol captioned telephone service (IPCTS), captioned telephone service (CTS), or other telecommunications relay services (TRS).

FIG. 1 shows a configuration where the first communication device 110 acts as a router for the voice signal from the second communication device 120 to the relay service. In such an embodiment, the voice signal of the far-end user 104 may be transmitted from the second communication device 120 to the first communication device 110. The voice signal of the far-end user 104 may then be transmitted from the first communication device 110 to the relay service 130 for the text captions to be generated in a text captioning embodiment. The text captions may then be transmitted from the relay service 130 to the first communication device 110 to be displayed as text captions for the hearing-impaired user to read during the conversation. The call assistant may also monitor the text captions that are generated and transmitted to the first communication device 110 to identify any errors that may have been generated by the voice recognition software. The call assistant may correct such errors, such as described in U.S. Pat. No. 8,379,801, issued Feb. 19, 2013, entitled "Methods and Systems Related to Text Caption Error Correction," the disclosure of which is incorporated herein in its entirety by this reference. In some embodiments the relay service 130 may be configured to receive the voice signal from the second communication device 120 and route the voice signal to the first communication device 110.

In addition, although FIG. 1 shows only two communication devices 110, 120, the communication system 100 may include more communication devices. It is contemplated that the communication system 100 may facilitate communication between any number and combinations of hearing-impaired users and far-end users. For example, in some embodiments two or more communication devices may be connected for facilitating communication between a hearing-impaired user and other hearing-impaired users and/or far-end users.

As discussed above, during a captioning communication session, the connection between the first communication device 110 and the relay service 130 may be interrupted. In some situations, the hearing-impaired user may have desired to disconnect from the relay service 130. For example, the first communication device 110 may have a "caption button"

that the user may select to enable or disable captioning. The caption button may be a mechanical input on the first communication device 110 itself and/or an input on a graphical user interface that the user may select. The term "button" is used herein for convenience in describing any input element into the communication device for enabling captioning. Thus, the term "button" may include other types of input elements that may be selected through methods other than by a pressing action. For example, the user may enable captioning by a sliding motion on an icon of a touch screen interface or other similar methods.

Enabling captioning may cause a captioning communication session to be established between the first communication device 110 and the relay service 130 for the first communication device 110 to transmit the audio signal from the far end user to the relay service 130, and to receive the text captions from the relay service 130 for display on the first communication device 110. Disabling captioning may cause the captioning communication session between the first communication device 110 and the relay service 130 to be terminated. This termination may be independent of the call between the first communication device 110 and the second communication device 120. In other words, captioning may be enabled and/or disabled during a call as desired by the hearing-impaired user. At the relay service side, when captioning is disabled, the call assistant may simply move on to the next call assigned to the call assistant by the relay service 130.

In some situations, the hearing-impaired user may not have desired to disable captioning during a call. For example, some contributing factors may be local issues for the hearing-impaired user, such as a network cable to the first communication device 110 being unplugged, a router being disabled, a spotty WiFi connection, etc. Some contributing factors may be relay service side issues, such as a server problem, termination by a call assistant, etc. Other contributing factors may be issues along the path between the first communication device 110 and the relay service 130, such as a network outage. In any event, the hearing-impaired user may have desired captioning, but the captioning may have been terminated during a call against the wishes of the hearing-impaired user (e.g., the hearing-impaired user did not select the caption button to disable captioning).

The first communication device 110 may be configured to automatically reconnect to the relay service 130 and establish a captioning communication session in response to detecting that the prior communication session was terminated during the call without the user selecting the caption button. In some embodiments, the new communication session may be with a different call assistant, whereas in some embodiments, the new communication session may be with the same call assistant from the prior communication session.

Figure 2:
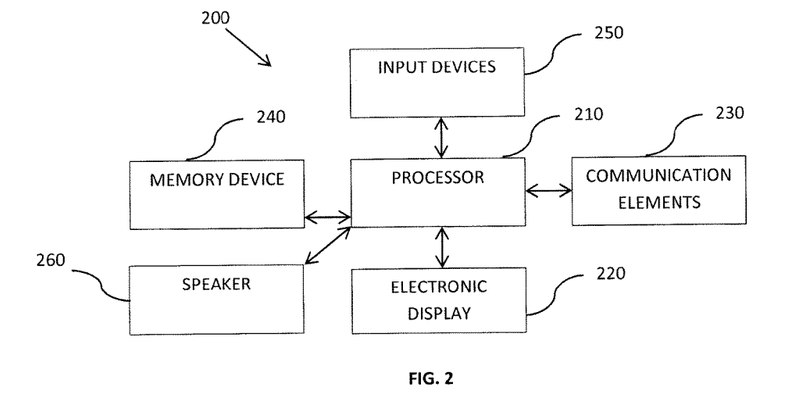
FIG. 2 is a simplified schematic block diagram of a communication device associated with a hearing-impaired user according to an embodiment of the disclosure.

FIG. 2 is a simplified schematic block diagram of a communication device 200 associated with a hearing-impaired user according to an embodiment of the disclosure. For example, the communication device 200 may be the first communication device 110 of FIG. 1. In particular, the communication device 200 may be configured to establish calls with other communication devices and captioning communication sessions with a relay service configured to assist the hearing-impaired user. The communication device 200 may be a caption enabled communication device, which may be implemented as a standalone device (e.g., a caption phone), or as implemented on another device (e.g., tablet computer, laptop computer, smart phone, etc.).

The communication device 200 may include a processor 210 operably coupled with an electronic display 220, communication elements 230, a memory device 240, input devices 250, and a speaker 260. In some embodiments, the communication device 200 may include a camera for also participating in a video communication session. The processor 210 may coordinate the communication between the various devices as well as execute instructions stored in computer-readable media of the memory device 240. The processor 210 may be configured to execute a wide variety of operating systems and applications including the computing instructions. The memory device 240 may be used to hold computing instructions, data, and other information for performing a wide variety of tasks including performing embodiments disclosed herein. By way of example and not limitation, the memory device 240 may include Synchronous Random Access Memory (SRAM), Dynamic RAM (DRAM), Read-Only Memory (ROM), Flash memory, and the like. The memory device 240 may include volatile and non-volatile memory storage for the communication device 200.

The communication elements 230 may be configured to communicate with other devices or communication networks, including other communication devices and the relay service. As non-limiting examples, the communication elements 230 may include elements for communicating on wired and wireless communication media, such as for example, serial ports, parallel ports, Ethernet connections, universal serial bus (USB) connections IEEE 1394 ("firewire") connections, Bluetooth wireless connections, 802.1 a/b/g/n type wireless connections, and other suitable communication interfaces and protocols. The input devices 250 may include a numeric keypad, a keyboard, a touchscreen, a remote control, a mouse, buttons, other input devices, or combinations thereof.

Figure 3:
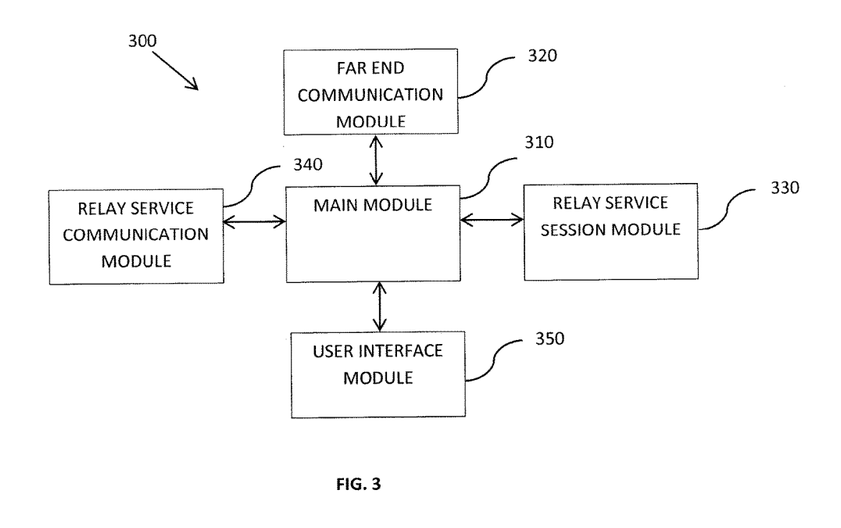
FIG. 3 is a simplified block diagram of the software modules executed by the processor of the communication device according to an embodiment of the disclosure.

FIG. 3 is a simplified block diagram 300 of the software modules executed by the processor of the communication device according to an embodiment of the disclosure. The modules include a main module 310, a far end communication module 320, a relay service session module 330, a relay service communication module 340, and a user interface (UI) module 350. The main module 310 may be configured to coordinate communication with each of the other modules 320, 330, 340, 350.

The far end communication module 320 may be configured to receive the audio data from the far end communication device and transmit the local audio data to the far end communication device. The far end communication module 320 may provide the interface between the communication line (e.g., PSTN, VoIP) and the main module 310 to communicate the audio data between the communication device and the far end communication device.

The relay service session module 330 may be configured to establish a captioning communication session with the relay service when captions are desired by the user. Establishing the captioning communication session may be responsive to the user selecting a captioning button. In some embodiments, establishing the captioning communication session may be responsive to the call itself such that the captions are enabled by default. For embodiments that use session initiation protocol (SIP), the relay service session module 330 may be configured as a SIP stack. Other protocols are also contemplated.

The relay service communication module 340 may be configured to transmit and receive data between the communication device and the relay service. For example, the relay service communication module 340 may be the transport layer for communicating through the captioning communication session established by the relay service session module 330. The relay service communication module 340 may transmit the far end audio signal (e.g., in audio packets) to the relay service and receive the text captions of the audio signal in return. For embodiments that use Real-time Transport Protocol (RTP), the relay service communication module 340 may be configured as an RTP stack. Other protocols are also contemplated.

The user interface module 350 may be configured to communicate with the user interface provided to the user. The user interface may include input and output devices that may include mechanical interfaces (e.g., mechanical buttons, switches, etc.) and/or graphical interfaces on the electronic display screen. For example, the user interface module 350 may receive inputs from the user (e.g., for placing/terminating calls, enabling/disabling captions, updating contacts, viewing call information, changing settings, etc.).

In addition to coordinating the communication with each of the other modules 320, 330, 340, 350, the main module 310 may determine whether or not a termination of the captioning communication session with the relay service was intentional, and to automatically reconnect with the relay service during the same call responsive to a determination that that the termination was unintentional. For example, if the main module 310 determines that the termination of the captioning communication session was unintentional, the main module 310 may instruct the relay service session module 330 to establish another communication session with the relay service.

In some embodiments, the main module 310 may determine whether the termination was intentional by determining which module 320, 330, 340, 350 informed the main module 310 that the captioning communication session is to be terminated and/or has been terminated. For example, if the main module 310 receives a termination request from the user interface module 350, the main module 310 may determine that the termination request is responsive to a user input (e.g., selecting the caption button to disable captions, etc.), which may indicate that the user intentionally initiated the termination request.

If the main module 310 receives a message from the relay service session module 330 indicating that the captioning communication session has been terminated, the main module 310 may determine that the termination was not responsive to a user input, which may indicate that the user did not intentionally initiated the termination request. As an example, the relay service session module 330 may periodically transmit a ping message to the relay service 130 and wait for an acknowledgement message in return. If the acknowledgement message is not received by the relay service session module 330 within a predetermined period of time (e.g., 30 seconds), the relay service session module 330 may send an error message to the main module that the captioning communication session has been terminated.

If the main module 310 receives a message from the relay service communication module 340 indicating that the captioning communication session has been terminated, the main module 310 may determine that the termination was not responsive to a user input, which may indicate that the user did not intentionally initiate the termination request. For example, the relay service communication module 340 may detect an error in the transmission of the audio signal to the relay service (e.g., when the audio packets are transmitted), and send an error message to the main module that the captioning communication session has been interrupted. In another situation, the call assistant may actively terminate the captioning communication session at the relay service. As a result, the relay service may send a termination request to the communication device. As a result, the relay service communication module 340 sends the termination request to the main module 310. With the termination request not being initiated by the hearing-impaired user, the main module 310 may determine that the hearing-impaired user may still desire captions. Therefore, the main module 310 may instruct the relay service session module 330 to establish another communication session with the relay service responsive to the call assistant terminating the captioning communication session.

Figure 4:
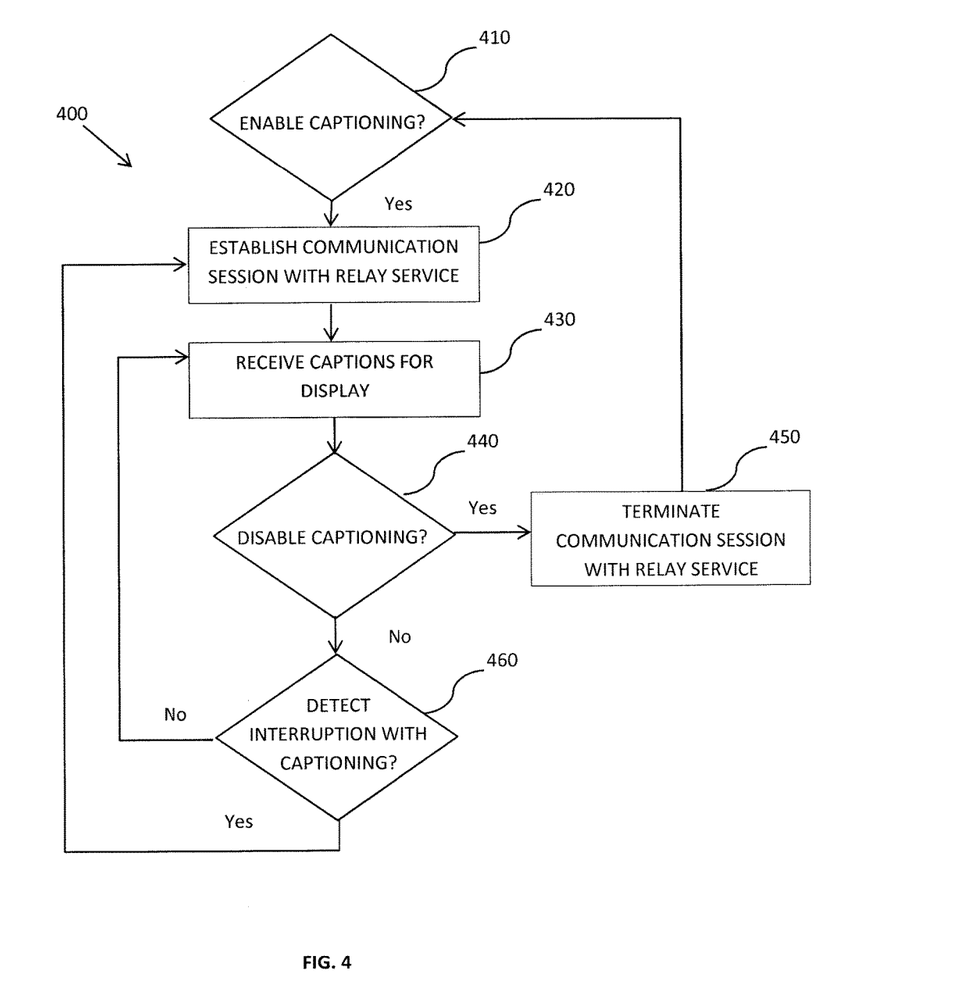
FIG. 4 is a flowchart illustrating a method for operating a communication device to automatically reconnect with a relay service according to an embodiment of the disclosure.

FIG. 4 is a flowchart 400 illustrating a method for operating a communication device to automatically reconnect with a relay service according to an embodiment of the disclosure. At operation 410, the processor may determine whether captioning has been enabled and, if so, establish a captioning communication session with the relay service at operation 420. For example, in some embodiments, the user may select a caption button on the communication device to enable captioning. The user may select the caption button during a call, while a call is incoming (e.g., before the call is answered), prior to making an outbound call, etc. In some embodiments, captioning may be enabled by default. In other words, when a captioning communication session is established with a far end communication device, captioning may be enabled by default such that a captioning communication session with the relay service may be established without an affirmative selection of a caption button. Thus, a captioning communication session with the relay service may be automatically established responsive to the call itself, such as while waiting for an answer or when the other party answers the call.

At operation 430, text captions may be received and displayed by the communication device from the relay service during the call. During this time, the communication device may also be routing the audio signal from the far end to the relay service to generate the text captions. At any time during the call, the user may decide to disable captioning. For example, the user may select the caption button. Thus, the processor may determine whether the hearing-impaired user has affirmatively disabled the captioning at operation 440. If so, the captioning communication session between the communication device and the relay service may be terminated at operation 450. The call between the communication device and the far end communication device may continue and the processor may await a user input to again enable captioning if desired by the hearing-impaired user. In some embodiments, disabling the captioning may be detected based on the call between the communication device and the far end communication device ending (e.g., one party hanging up).

At operation 460, the processor may detect interruption with the captioning communication session with the relay service. This interruption may not have been through the normal methods for the user to indicate a desire to disable captioning. For example, the captioning communication session may be terminated by a problem with the local network connection of the communication device (e.g., spotty WiFi connection, disabled router, unplugged cable, etc.) or external network problems or even issues with the relay service (e.g., server error, call assistant initiated disconnect, etc.).

If the processor does not detect such an interruption in the captioning communication session with the relay service, the communication device may continue to receive captions for display to the hearing-impaired user during the call at operation 430. If, however, the processor does detect such an interruption, the communication device may return to operation 420 to establish a captioning communication session with the relay service if the connection to the relay service becomes available during the present call. If the connection to the relay service is not available, the communication device may continue to attempt to establish another communication session until the present call is terminated. In some embodiments, the communication device may attempt to establish another communication session according to a predetermined interval (e.g., every 5 seconds) until either the new communication session is established or the present call is terminated. In some embodiments, the communication device may attempt to establish another communication session according to staggered intervals. For example, a first attempt may occur after 2 seconds, a second attempt may occur after another 4 seconds, a third attempt may occur after another 8 seconds, a fourth attempt may occur after another 16 seconds, etc. At some point, the staggered interval for attempts may be increased up to a maximum interval (e.g., every 30 seconds) until the call ends.

Thus, the communication device may be automatically reconnected to the relay service during the same call to establish a new communication session and receive captions when the connection to the relay service is available. As a result, the burden on the hearing-impaired user to continue trying to begin captioning again may be reduced, and the amount of time that the captions are unintentionally disabled may be reduced. If the new communication session is established, the relay service may assign the new communication session to a new call assistant who is the next available in line. This may be the case as the prior call assistant may have already been assigned a new call from a different communication device. In some embodiments, the new communication session may be assigned to the same call assistant as the prior communication session. In some situations, this may be purely coincidental, while in other situations it may be desirable for the system to attempt to ensure the same call assistant is assigned to the new communication session for consistency, as the call assistant is already familiar with the speaking patterns of the far-end user as it is part of the same call as before. For example, the communication device may have a call assistant identifier during the captioning communication session so that when the request for reconnection occurs, the communication device may send the call assistant identifier to the relay service with the request. In some embodiments, the relay service may store a record of the call assistants and communication devices used during a specific call such that the relay service may recognize a request for reconnection for the same call. As a result, the new session may be reassigned to the same call assistant, if available. In such an embodiment, there may be a waiting period (e.g., 1 minute) that may elapse before the call assistant is assigned to the next available call while waiting for reconnection.

Figure 5:
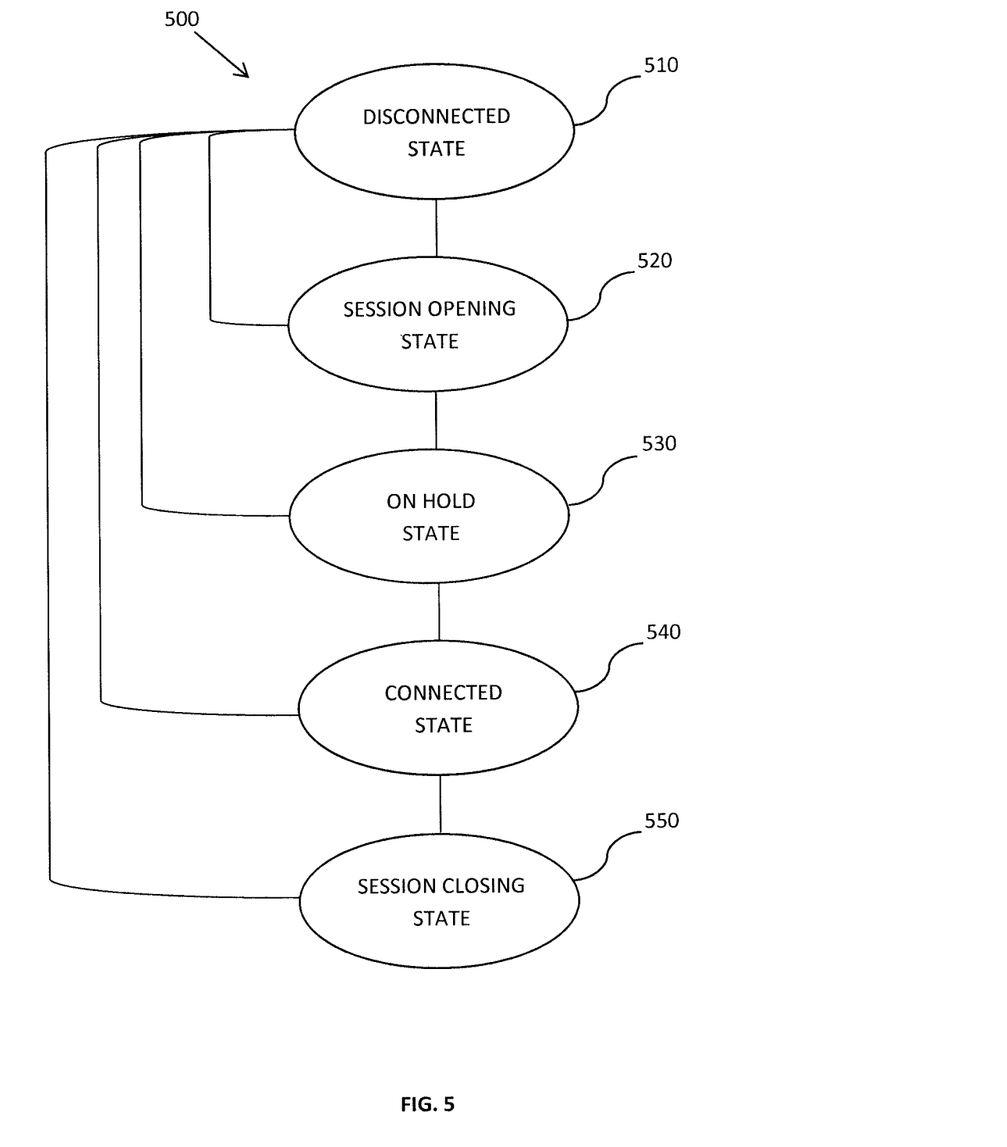
FIG. 5 is a state diagram for a state machine for the main module according to an embodiment of the disclosure.

FIG. 5 is a state diagram for a state machine for the main module 310 of FIG. 3 according to an embodiment of the disclosure. The main module 310 may begin in a disconnected state 510 during which time the main module 310 may await instructions to enable captioning. In some embodiments, the instructions may be responsive to the user selecting a caption button to enable the captions during a call. In some embodiments, the instructions may be responsive to a "default on" setting in which the call itself enables captions and requests a captioning communication session with the relay service.

The main module 310 may then enter into a session opening state 520 and instruct the relay service session module 330 to transmit a session invitation to the relay service for requesting a captioning communication session with the relay service. The relay service session module 330 may receive an acknowledgement from a hold server while the relay service waits for an available call assistant, and the main module 310 may enter into an on hold state 530.

The relay service session module 330 may then receive another message indicating that the call has been accepted by the relay service and assigned to a call assistant. The message may also include the port ID and IP address for the main module 310 to instruct the relay service communication module 340 to transmit the audio signal and receive the text captions. The main module 310 may then enter a connected state 540.

At some point during the connected state 540, the hearing-impaired user may desire to terminate the connection to the relay service. For example, the hearing-impaired user may select the captioning button to disable captioning during a call. In some situations, the call itself may simply end. In either situation, the main module 310 may enter into a session closing state 550. In the session closing state 550, the communication device may send a message to the relay service (e.g., through the relay service communication module 340) to inform the relay service that the captioning communication session will be ending and that no more audio signals will be sent. The main module 310 may then return to the disconnected state 510. In some embodiments, the main module 310 may return to the disconnected state 510 responsive to receiving an acknowledgement from the relay service that the caption communication is over. In some embodiments, the main module 310 may return to the disconnected state 510 responsive to a predetermined timeout period (e.g., 5 seconds) expiring if the acknowledgement from the relay service is not received. During this predetermined timeout period, the communication device may continue to receive text captions even though additional audio has not been sent in case the relay service has not yet sent the text captions for the audio signal that was sent prior to entering the session closing state 550 and is still in progress.

At any time during the session opening state 520 or the on hold state 530, the call itself may be terminated. In such a situation, the main module 310 may simply return to the disconnected state 510 as a captioning communication session had not yet been established. However, during the connected state 540, termination of the call itself may still cause the main module 310 to enter the session closing state 550 so that the established captioning communication session may be closed and the in progress text captions may be received. In some embodiments, terminating the call during the session opening state 520 or the on hold state 530 may cause the main module 310 to enter the session closing state 550 to shut down the connection in an orderly fashion.

In addition, at any time during the session opening state 520, the on hold state 530, or the connected state 540, the captioning communication session may be terminated due to events that are unintended by the hearing-impaired user. As discussed above, such events may include spotty WiFi, disconnected cables, disconnected router, network issues along the path to the relay service, server problems at the relay service, termination by the call assistant, and other issues that may cause the captioning communication session to be terminated even though the hearing-impaired user may still desire captioning during the call. The main module 310 may detect that one of these situations has occurred by recognizing that the termination message was received by a module other than the user interface module. For example, error messages may be generated by the relay service session module 330 and/or the relay service communication module 340 and sent to the main module 310. In some embodiments, the main module 310 may detect that one of these situations has occurred by recognizing that the termination request occurred during a state 520, 530, 540 in which such a termination request is not expected.

In such situations, the main module 310 may return to the disconnected state 510 and automatically enter the session opening state 520 to instruct the relay service session module 330 to send another session request to the relay service. If the connection to the relay service is still not available, the main module 310 may continue to instruct the relay service session module 330 to send additional session requests to the relay service until a new communication session is established or until the present call ends. Such session requests may occur at regular intervals and/or staggered intervals as desired.

The examples discussed above generally discuss the situation in which the captions are enabled during a call (whether by default or user selection), and where the established captioning communication session is subsequently terminated. Some embodiments may also include the situations in which the user has indicated that captions are desired, but that the captioning communication session was never established because the connection to the relay service was unavailable at the beginning. For example, the hearing-impaired user may select the caption button to enable captions at a time that the network to connect to the relay service was unavailable. Once the hearing-impaired user has made this indication, the main module 310 may continue to instruct the relay service session module 330 to attempt to automatically establish the captioning communication session if the connection to the relay service becomes available during the call. Similarly, a communication device that has captions set to be on by default may not be able to establish the captioning communication session at the beginning of the call. As a result, the main module may continue to instruct the relay service session module 330 to attempt to automatically establish the captioning communication session if the connection to the relay service becomes available during the call.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of embodiments encompassed by the disclosure as contemplated by the inventors.

What is claimed is:

1. A communication device comprising:
a processor configured to:
establish a voice communication session with a far-end communication device to communicate audio data therebetween during the voice communication session;
detect if captioning is enabled for the voice communication session, wherein captioning is selectable by a user to be one of either enabled or disabled;
attempt to establish a captioning communication session with a captioning communication service to receive text data corresponding to a text transcription of far-end audio data during the voice communication session responsive to captioning being enabled; and
automatically continue to attempt to establish a captioning communication session without user input at intervals during the voice communication session based, at least in part, upon one or more messages generated from different software modules operated by the processor for as long as the voice communication session is still established, captioning is still enabled, and until the captioning communication session is established,
wherein a main module of the different software modules is configured to establish the captioning communication session according to a state machine that includes:
a disconnected state during which the main module awaits instructions to enable captioning;
a session opening state during which a session invitation is sent to the captioning communication service responsive to receiving the instructions to enable captioning;
a connected state during which audio is sent to the captioning communication service and text captions are received from the captioning communication service responsive to receiving an acceptance message from the captioning communication service; and
a session closing state during which a message is sent to the captioning communication service responsive to receiving an indication that captioning has been disabled; and
an electronic display operably coupled with the processor, the electronic display configured to display the text captions received through the captioning communication session during the voice communication session.

2. The communication device of claim 1, wherein the processor is configured to attempt to establish the captioning communication session and automatically continue to attempt to establish the captioning communication session prior to any previous captioning communication session being successfully established during the voice communication session.

3. The communication device of claim 2, wherein captioning is enabled initially for the voice communication session by default.

4. The communication device of claim 1, wherein the processor is configured to attempt to establish the captioning communication session and automatically continue to attempt to establish the captioning communication session responsive to a previous captioning communication session being disconnected during the voice communication session without captioning being disabled by the user.

5. The communication device of claim 1, further comprising a caption button configured to receive a user input to control captioning as being either enabled or disabled.

6. The communication device of claim 5, wherein the caption button is at least one of a mechanical input or an input of a graphical user interface generated by the processor and displayed by the electronic display.

7. A communication device comprising:
a processor configured to control operations comprising:
establish a voice communication session with a far-end communication device to communicate audio data therebetween during the voice communication session;
detect if captioning is enabled for the voice communication session, wherein captioning is selectable by a user to be one of either enabled or disabled;
attempt to establish a captioning communication session with a captioning communication service to receive text data corresponding to a text transcription of far-end audio data during the voice communication session responsive to captioning being enabled; and
automatically continue to attempt to establish a captioning communication session without user input at intervals during the voice communication session for as long as the voice communication session is still established, captioning is still enabled, and until the captioning communication session is established;
an electronic display operably coupled with the processor, the electronic display configured to display text captions received through the captioning communication session during the voice communication session; and
a memory device having instructions stored thereon for execution of software modules by the processor, including a main module configured to coordinate communication with other modules, and to control automatic attempts to establish the captioning communication session responsive to determining if captioning is enabled.

8. The communication device of claim 7, wherein the main module is configured to determine if captioning is enabled based, at least in part, on one or more messages received from the other modules.

9. The communication device of claim 8, wherein the main module is configured to determine if captioning is enabled based, at least in part, on a message received from a captioning session module configured to establish the captioning communication session with the captioning communication service.

10. The communication device of claim 8, wherein the main module is configured to determine if captioning is enabled based, at least in part, on a message received from a captioning communication module configured to transmit and receive data between the communication device and the captioning communication service during the captioning communication session.

11. The communication device of claim 8, wherein the main module is configured to determine if captioning is enabled based, at least in part, on a message received from a module other than a user interface module configured to receive user inputs through a user interface.

12. A communication device comprising:
an electronic display; and
a processor operably coupled with the electronic display, the processor programmed to control operations comprising:
communicate audio data during a call between the communication device and a far-end communication device through a first connection therebetween;
enable captioning for the call responsive to a user indication;
disable captioning for the call responsive to a second user indication;
establish a second connection between the communication device and a remote captioning service responsive to the captioning being enabled for the call;
automatically re-establish the second connection between the communication device and the remote captioning service responsive to detecting the second connection has been terminated in a manner different than being responsive to the second user indication of intentionally disabling captioning;
execute a main module configured to coordinate communication with other modules and to control automatic attempts to establish the second connection responsive to determining if captioning is enabled; and
receive text captions from the remote captioning service and provide the text captions to the electronic display for display by the electronic display while the second connection is established.

13. The communication device of claim 12, wherein the user indication and the second user indication include a respective selection and de-selection of a caption button of the communication device.

14. A communication device comprising:
an electronic display; and
a processor operably coupled with the electronic display, the processor programmed to control operations comprising:
communicate audio data during a call between the communication device and a far-end communication device through a first connection therebetween;
enable captioning for the call responsive to a user indication;
disable captioning for the call responsive to a second user indication;
establish a second connection between the communication device and a remote captioning service responsive to the captions being enabled for the call;
automatically re-establish the second connection between the communication device and the remote captioning service responsive to detecting the second connection has been terminated in a manner different than being responsive to the second user indication for intentionally disabling captioning, wherein detecting the manner of termination of the second connection is based, at least in part, upon one or more messages generated from different software modules operated by the processor; and
receive text captions from the remote captioning service and display the text captions on the electronic display while the second connection is established.

15. The communication device of claim 14, wherein the operations further include determine that the second connection has been terminated in a manner different than being responsive to the second user indication by receiving an error message from a captioning session module that is generated if no response is received from the remote captioning service within a predetermined period of time following a ping message being sent to the remote captioning service.

16. The communication device of claim 14, wherein the operations further include determine that the second connection has been terminated in a manner different than being responsive to the second user indication by receiving an error message from a captioning communication module that is generated if there is an error during transmission of audio packets from the communication device to the remote captioning service.

17. The communication device of claim 14, wherein the operations further include determine that the second connection has been terminated in a manner different than being responsive to the second user indication by receiving a termination message from the remote captioning service indicating that the remote captioning service has been terminated by a call assistant handling the call at the remote captioning service.

18. A method comprising:
communicating audio data with a far-end communication device during a voice communication session between at least two users;
receiving text data from a remote captioning service over a captioning communication session responsive to captioning being enabled during the voice communication session, wherein captioning is either enabled or disabled based, at least in part, on a user indication;
displaying text captions on an electronic display corresponding to the text data received from the remote captioning service; and
automatically attempting to re-establish the captioning communication session responsive to determining that the captioning communication session has been terminated in a manner that is different than the user indication, wherein determining the manner of termination of the captioning communication session is based, at least in part, upon one or more messages generated from different software modules coordinated by a main module executed by a processor that controls automatic attempts to establish the captioning communication session while also maintaining the voice communication session with the far-end communication device.

19. The method of claim 18, further comprising receiving the user indication responsive to a selection from a user interface.

20. The method of claim 18, wherein the user indication is set to captioning enabled by default.

21. A method comprising:
communicating audio data with a far-end communication device during a voice communication session between at least two users;
receiving text data from a remote captioning service over a captioning communication session responsive to captioning being enabled during the voice communication session, wherein captioning is either enabled or disabled based, at least in part, on a user indication;
displaying text captions on an electronic display corresponding to the text data received from the remote captioning service; and
automatically attempting to re-establish the captioning communication session responsive to determining that the captioning communication session has been terminated in a manner that is different than the user indication including detecting an error in transmission of audio data to the remote captioning service over the captioning communication session, while also maintaining the voice communication session with the far-end communication device.

22. The method of claim 18, wherein automatically attempting to re-establish the captioning communication session is responsive to detecting an error after sending a ping message to the remote captioning service.

23. The method of claim 18, wherein automatically attempting to re-establish the captioning communication session is responsive to receiving a termination message from the remote captioning service indicating that a call assistant at the remote captioning service terminated the captioning communication session.

24. The method of claim 18, wherein automatically attempting to re-establish the captioning communication session is performed without user input until a new captioning communication session is established the remote captioning service, until captioning is disabled by the user indication, or until the voice communication session is terminated.

25. A method comprising:
communicating audio data with a far-end communication device during a voice communication session between at least two users;
receiving text data from a remote captioning service over a captioning communication session responsive to captioning being enabled during the voice communication session, wherein captioning is either enabled or disabled based, at least in part, on a user indication;
displaying text captions on an electronic display corresponding to the text data received from the remote captioning service; and
automatically attempting to re-establish the captioning communication session responsive to determining that the captioning communication session has been terminated in a manner that is different than the user indication, while also maintaining the voice communication session with the far-end communication device, and including sending session requests at staggered intervals that are increased over time up to a maximum interval until the captioning communication session is re-established or until the voice communication session is terminated.

26. The communication device of claim 1, wherein the one or more messages includes an error message received by the main module during the session opening state or the connected state.

27. The communication device of claim 1, wherein different software modules further include:
a far-end communication module configured to send and receive audio data with the far-end communication device;
a captioning service session module configured to establish a captioning communication session with the captioning communication service;
a captioning service communication module configured to send and receive data between the captioning communication service; and
a user interface module configured to communicate with the electronic display.

28. The communication device of claim 27, wherein the one or more messages
are received by the main module from either the captioning service session module or the captioning service communication module.

* * * * *